United States Patent
Deng et al.

(10) Patent No.: US 10,922,934 B2
(45) Date of Patent: Feb. 16, 2021

(54) VIBRATION SYSTEM AND METHOD OF ADDING TACTILE IMPRESSION

(71) Applicant: AAC Technologies Pte. Ltd., Singapore (SG)

(72) Inventors: Dongping Deng, Shenzhen (CN); Xiuyue Wang, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/706,804

(22) Filed: Dec. 8, 2019

(65) Prior Publication Data
US 2020/0211339 A1     Jul. 2, 2020

(30) Foreign Application Priority Data
Dec. 29, 2018 (CN) .......................... 201811636700.4

(51) Int. Cl.
*G08B 6/00* (2006.01)
*H04B 1/06* (2006.01)
*H04B 5/00* (2006.01)

(52) U.S. Cl.
CPC .................. *G08B 6/00* (2013.01); *H04B 1/06* (2013.01); *H04B 5/00* (2013.01)

(58) Field of Classification Search
CPC ............ A41D 13/0015; A41D 1/002; A61B 2503/10; A61B 2562/0209; A61B 2562/0219; A61B 2562/04; A61B 2562/125; A61B 2562/164; A61B 5/002; A61B 5/0205; A61B 5/0492; A61B 5/1118; A61B 5/112; A61B 5/6802; A61B 5/6804; A61N 1/0452; A61N 1/0484; A61N 1/36003; A63B 2024/0093; A63B 2071/0625; A63B 2071/065;
(Continued)

(56) References Cited

U.S. PATENT DOCUMENTS

| 6,688,343 | B1 * | 2/2004 | Park ...................... B60P 3/2295 |
| | | | 141/12 |
| 2004/0082831 | A1 * | 4/2004 | Kobashikawa ........ A61H 19/44 |
| | | | 600/38 |

(Continued)

FOREIGN PATENT DOCUMENTS

| CN | 107257636 A1 | 10/2017 |
| CN | 110032274 A1 | 7/2019 |

OTHER PUBLICATIONS

PCT search report dated Jan. 23, 2020 by SIPO in related PCT Patent Application No. PCT/CN2019/113826 (5 Pages).

*Primary Examiner* — Daniel Previl
(74) *Attorney, Agent, or Firm* — W&G Law Group LLP

(57) ABSTRACT

A vibration system includes: an external device, a vibrator detachably fixed to the external device, a processor in signal transmission with the vibrator, and a control device configured to control the processor. The processor is configured to receive a wireless signal containing vibration characteristic data sent by the control device, and parse the wireless signal to obtain a drive signal, and the vibrator is configured to receive the drive signal to generate vibration. A method of adding a tactile impression is also provided. With the vibration system and the method of adding the tactile impression provided, a tactile impression experience of the external device can be achieved without changing a structure of the external device.

6 Claims, 3 Drawing Sheets

(58) Field of Classification Search
CPC .... A63B 2071/0655; A63B 2071/0666; A63B 21/00185; A63B 21/00189; A63B 21/005; A63B 21/0053; A63B 21/008; A63B 21/0083; A63B 21/00845; A63B 21/0087; A63B 21/012; A63B 21/023; A63B 21/028; A63B 21/0552; A63B 21/159; A63B 21/4011; A63B 21/4017; A63B 21/4025; A63B 21/4039; A63B 21/4047; A63B 2209/08; A63B 2209/10; A63B 2213/004; A63B 2220/12; A63B 2220/44; A63B 2220/51; A63B 2220/803; A63B 2225/20; A63B 2225/50; A63B 2230/202; A63B 2230/205; A63B 2230/207; A63B 2230/42; A63B 2230/50; A63B 2230/60; A63B 2230/65; A63B 2230/75; A63B 23/02; A63B 23/0482; A63B 23/0494; A63B 23/1245; A63B 23/1281; A63B 24/0087; A63B 71/0622; G06Q 10/0639; G06Q 50/22; G09B 19/0038; G09B 23/28; H04M 1/7253; H04M 19/04; H04M 19/047; H04M 1/72527; H04R 11/00; H04R 2225/67; H04R 2460/13; H04R 25/606; G08B 6/00; A61H 19/32; A61H 19/34; A61H 19/40; A61H 19/44; A61H 2201/0153; A61H 2201/0207; A61H 2201/0214; A61H 2201/0257; A61H 2201/10; A61H 2201/1253; A61H 2201/5012; A61H 2201/5097; A61H 23/00; A61H 23/0263; A61H 33/12; B05B 17/06; B05B 1/0261; B05B 1/08; B05B 1/16; B05B 2201/58; B28B 17/00; B28B 1/0935; B29C 48/07; B29C 48/30; B29C 48/302; B29C 49/04; B29C 49/06; B29L 2031/10; B29L 2031/7158; B41J 2202/03; B41J 2/045; B41J 2/14233; C07B 2235/3201; C07B 2235/3215; C07B 2235/3232; C07B 2235/3236; C07B 2235/3251; C07B 2235/3274; C07B 2235/3298; C07B 2235/667; C07B 2235/768; C07B 2235/77; C07B 2235/81; C07B 35/495; C07B 35/62685; C07B 35/6455; E01C 19/407; E04G 11/22; E04G 21/08; F24F 2221/12; F24F 6/12; G01H 1/003; G01L 1/125; G01L 1/127; H01L 41/06; H01L 41/083; H01L 41/0973; H01L 41/1871; H01L 41/1873; H02N 2/0005; H02N 2/106; H02N 2/163; H04B 1/06; H04B 1/3888; H04B 5/00

USPC ..... 340/407.1, 384.73, 825.69, 825.36, 7.29, 340/5.61, 693.8, 691.6, 683, 648, 582, 340/576, 566

See application file for complete search history.

(56) References Cited

U.S. PATENT DOCUMENTS

| | | | | |
|---|---|---|---|---|
| 2008/0057576 | A1* | 3/2008 | Virtanen | C12M 23/34 435/348 |
| 2008/0227000 | A1* | 9/2008 | Honda | G03G 9/08753 430/48 |
| 2009/0326791 | A1* | 12/2009 | Horvitz | G08G 1/00 701/119 |
| 2011/0127858 | A1* | 6/2011 | Park | B06B 1/045 310/25 |
| 2012/0302293 | A1* | 11/2012 | Johnson | B06B 1/045 455/567 |
| 2016/0349842 | A1* | 12/2016 | Sills | G06F 3/016 |
| 2019/0095963 | A1* | 3/2019 | Martin | G06Q 30/0278 |
| 2019/0199388 | A1* | 6/2019 | Cunningham | G06F 1/26 |

* cited by examiner

VIBRATION SYSTEM AND METHOD OF ADDING TACTILE IMPRESSION

TECHNICAL FIELD

The present invention relates to the field of haptic feedback technologies, and in particular, to a vibration system and a method of adding a tactile impression.

BACKGROUND

With a rapid development of technology and life, people are increasingly demanding realistic experiences, among which tactile impression experience is very important. Here, the tactile impression refers to a reaction caused by contact, which is a very important way for a human body to obtain external information, and is very important for people's life and entertainment.

The inventors have found that at least following problems exist in the prior art: some electronic devices can only provide visual and auditory experiences such as images and sounds, but are lack of scenario tactile impression simulation, and thus people cannot intuitively obtain tactile stimulus from the electronic devices. As a result, users cannot have good experience when using these electronic devices in daily life, entertainment, official business, etc. Therefore, it is necessary to provide a new vibration system structure to solve the above problems.

BRIEF DESCRIPTION OF DRAWINGS

Many aspects of exemplary embodiment can be better understood with reference to following drawings. Components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the purpose, technical solutions and advantages of the present invention, the embodiments of the present invention will be described in details as follows with reference to the accompanying drawings. However, it should be understood by those skilled in the art that, technical details are set forth in the embodiments of the present invention so as to better illustrate the present invention. However, the technical solutions described in the present invention can be achieved without these technical details and various changes and modifications based on the following embodiments.

Figure 1:
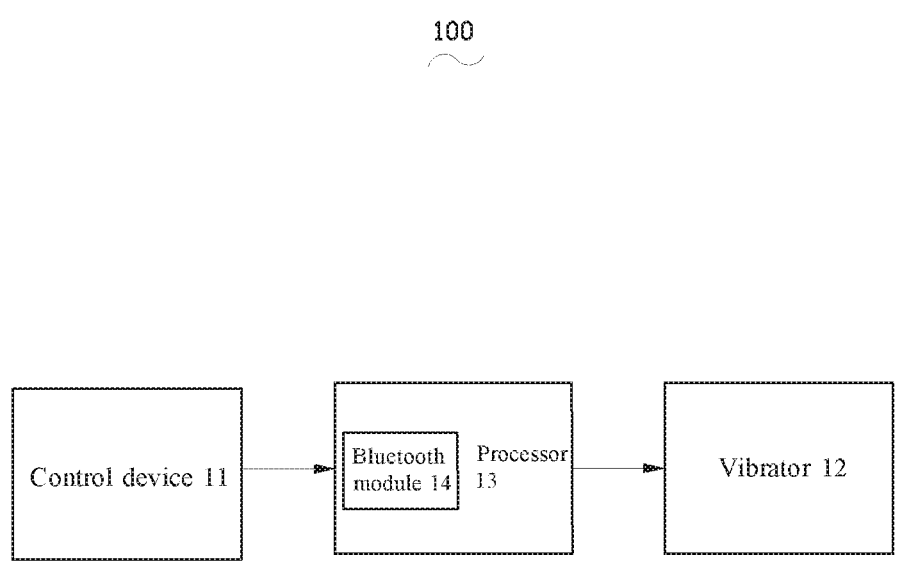
FIG. 1 is a schematic block diagram of a vibration system according to a first embodiment of the present invention.

As shown in FIG. 1, a first embodiment of the present invention relates to a vibration system 100, including: an external device 11, a vibrator 12 and a processor 13 detachably fixed to the external device 11, and a control device 14 for controlling the processor 13. A signal is transmitted between the processor 13 and the vibrator 12. The processor 13 is configured to receive a wireless signal containing vibration characteristic data sent by the control device 14, and is further configured to parse the wireless signal to obtain a drive signal. The vibrator 12 is configured to receive the drive signal to generate vibration.

Compared with the prior art, in this embodiment of the present invention, the processor 13 can receive the wireless signal containing the vibration characteristic data sent by the control device 14 and parse the wireless signal to obtain the drive signal, and the vibrator 12 can receive the drive signal to generate vibration, so that the control device 14 can control the vibrator 12 to generate vibration. The vibrator 11 can be detachably fixed to the external device 11, so that the vibration can be transmitted to the external device 11 through the vibrator without changing a structure of the external device 11. In this way, the tactile impression experience of the external device can be achieved, and further, the vibrator can be detached from the external device 11 when the tactile impression experience is not required, so as to avoid inconvenience caused by the vibrator and the components thereon when the external device 11 is not required for the function of tactile impression experience. Therefore, the convenience thereof is improved.

In this embodiment, the processor 13 includes a bluetooth module 14. The bluetooth module 14 is bonded to the control device 14 and is configured to receive the wireless signal containing the vibration characteristic data sent by the control device 14. Here, the vibration characteristic includes, for example, an amplitude and a frequency of the vibration. Since a signal transmission of the bluetooth module 14 can be performed within a certain spatial range, a vibration control of the vibrator 12 within a short range then can be achieved.

Further, the processor 13 is a microcontroller unit (MCU) having a bluetooth serial port. The MCU is also called a single-chip microcomputer or a single-chip computer, which is a chip-level computer formed by properly reducing a frequency and a size of a central processor 13 and integrating peripheral interfaces such as a memory, a counter, a USB, an A/D conversion, a UART, a PLC, a DMA, and even an LCD drive circuit onto a single chip, which is for achieving different combinations of controls for different applications.

Figure 2:
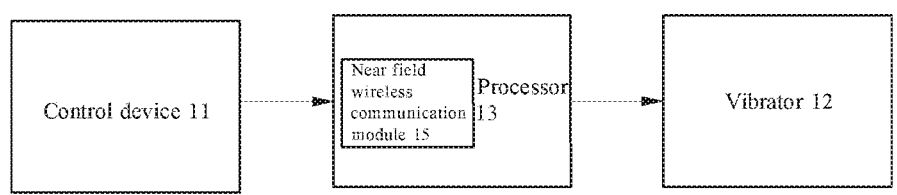
FIG. 2 is a schematic block diagram of a vibration system in another embodiment of the present invention.

It should be understood that in another embodiment, as shown in FIG. 2, the processor 13 includes a near field wireless communication module 15 for approaching the control device 14 and receiving the wireless signal containing the vibration characteristic data sent by the control device 14. The near field wireless communication module 15 is referred to as NFC, which stands for near field communication and is a near field high-frequency wireless communication technology that allows non-contact point-to-point data transmission between vibration systems to exchange data.

It should be noted that the vibrator 12 is fixed to the external device 11 through an adhesive layer, so that the vibrator can be adhered to the external device, which is simple in operation and convenient.

It should be understood that in another embodiment, the vibrator 12 may also be detachably fixed to the external device 11 in other ways. For example, the vibrator 12 is detachably fixed to the external device 11 via a body, and the body includes a body portion that is attached to a rear cover of the external device 11 and a catch portion that extends from the body portion and used to catch the external device 11. The vibrator 12 is disposed on the body portion. Compared with a case in which it is fixed by using an adhesive layer, in this configuration, the body can be detached from and installed to the external device 11 through the catch portion for multiple times without affecting installation stability on the external device 11. In this way, it is convenient for installation and usage at any time, and can be removed at any time when not using it without concerning about affecting next installation, thereby improving the convenience thereof.

It should be noted that the control device 14 and the external device 11 can be an integrated same component or two individual components. When the control device 14 and the external device 11 are the same component having an NFC function, since the processor is closer to the external device 11 after the vibrator is detachably fixed to the external device 11, the external device 11 can conveniently transmits a wireless signal to the processor 13.

Figure 3:
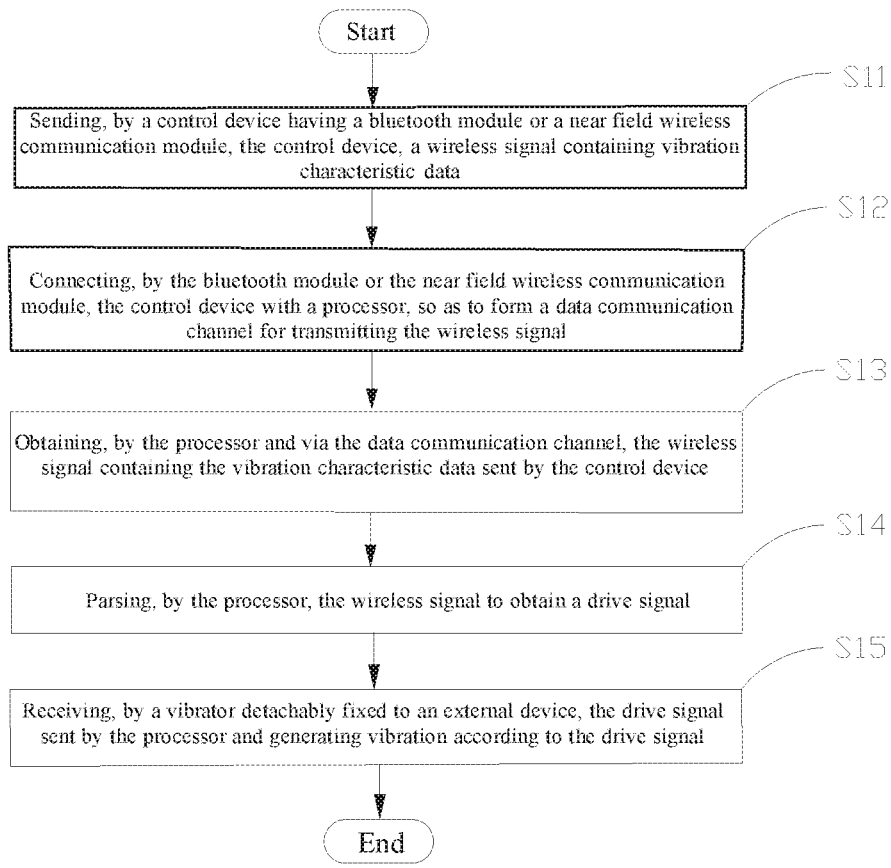
FIG. 3 is a flow chart of a method of adding a tactile impression according to a second embodiment of the present invention.

As shown in FIG. 3, a second embodiment of the present invention provides a method of adding a tactile impression, including the following steps.

At step S11, a control device including a bluetooth module or a near field wireless communication module is provided, and the control device sends a wireless signal containing vibration characteristic data.

At step S12, a processor is provided, the control device is connected to the processor through the bluetooth module or the near field wireless communication module, so as to form a data communication channel for transmitting the wireless signal.

In step S13, the processor is matched to the control device by using the bluetooth module, and after the matching is succeeded, the data communication channel is established according to a bluetooth transmission protocol, and a method and a protocol (i.e., a handshake protocol) for parsing the data are generated. Alternatively, by using an NFC function of the near field wireless communication module, the data communication channel is established by approaching the control device, and a method and a protocol for parsing the data are generated.

At step S13, the processor obtains, by using the data communication channel, the wireless signal containing the vibration characteristic data sent by the control device.

In step S13, the control device sends the wireless signal to the data communication channel, and the processor obtains the wireless signal from the data communication channel. Here, the wireless signal contains the vibration characteristic data, and the vibration characteristic includes an amplitude and a frequency of the vibration.

At step S14, the processor parses the wireless signal to obtain a drive signal.

In step S14, the processor parses the wireless signal according to the method and protocol for parsing data to obtain the drive signal. Further, the processor parses to obtain a real-time vibration command and vibration effect data, and according to the vibration command, the processor transmits the drive signal to the vibrator through a hardware transmission line.

At step S15, a vibrator and an external device are provided, the vibrator is detachably fixed to the external device, and the vibrator receives the drive signal sent by the processor and generates vibration according to the drive signal.

Compared with the prior art, in this embodiment, the processor obtains the wireless signal containing the vibration characteristic data sent by the control device and then parses the wireless signal to obtain the drive signal, and the vibration is generated according to the drive signal, thereby achieving an effect of generating vibration according to vibration control of the control device, so that the external device can be driven to vibrate without changing a structure of the external device, thereby achieving the tactile impression experience of the external device.

It should be noted that the control device and the external device may be the same component or two individual components. In an example as follows, the control device and the external device are the same cellphone having a bluetooth function.

In one embodiment, the processor is a micro processing control unit, and the vibrator is a motor. The method includes the following steps.

First, the cellphone is matched to a bluetooth of a MCU processor. The MCU processor is powered on and simultaneously turns on the bluetooth to wait for connection. The control device of the cellphone turns on a bluetooth function and searches for a bluetooth device, selects the found bluetooth of the MCU processor and performs bluetooth matching. After the matching is succeeded, according to the existing bluetooth transmission protocol, a data communication channel is automatically established between the control device of the cellphone and the MCU processor.

Then, data is transmitted between the cellphone and MCU processor. After the data communication channel is established between the control device of the cellphone and the MCU processor. According to an universal bluetooth programming interface, the control device of the cellphone transmits a real-time vibration command and vibration effect data to the established data communication channel through the bluetooth programming interface, and then the data is transmitted through the communication channel to a bluetooth interface of the MCU processor, and the MCU processor obtains the data from the bluetooth interface through the universal programming interface.

Then, the MCU processor parses the data. After receiving the transmitted data, the MCU parses to obtain the real-time vibration command and the vibration effect data by using a method and a protocol (i.e., a handshake protocol) agreed upon by both the cellphone and the MCU processor.

Then, the MCU processor sends a drive signal. The MCU parses to obtain the vibration command and the vibration data, and according to the vibration command, the MCU processor transmits the drive signal to the motor through a hardware transmission line (such as I2C).

Finally, the motor generates vibration. The motor attached to the external device vibrates after receiving the drive signal, and drives the external device to vibrate, thereby achieving a vibration experience of the external device It should be understood by those skilled in the art that the above embodiments are merely some specific embodiments of the present invention, and various changes in form and details may be made without departing from the scope of the present invention.

What is claimed is:

1. A vibration system, comprising:
   an external device,
   a vibrator detachably fixed to the external device,
   a processor in signal transmission with the vibrator, and
   a control device configured to control the processor,
   wherein the processor is configured to receive a wireless signal containing vibration characteristic data sent by the control device, and to parse the wireless signal to obtain a drive signal, and the vibrator is configured to receive the drive signal to generate vibration;
   wherein the vibrator is fixed to the external device by an adhesive layer; or
   the vibrator is detachably fixed to the external device via a body; and the body includes a body portion attached to a rear cover of the external device and a catch portion extending from the body portion to catch the external device.

2. The vibration system as described in claim 1, wherein the processor comprises a bluetooth module bonded to the control device, and the Bluetooth module is configured receive the wireless data containing the vibration characteristic data sent by the control device.

3. The vibration system as described in claim 2, wherein the processor is a microcontroller unit having a bluetooth serial port.

4. The vibration system as described in claim 1, wherein the processor comprises a near field wireless communication module configured to receive, when being close to the control device, the wireless data containing the vibration characteristic data sent by the control device.

5. A method of adding a tactile impression, comprising steps of:
   sending, by a control device having a bluetooth module or a near field wireless communication module, a wireless signal containing vibration characteristic data;
   connecting, by the bluetooth module or the near field wireless communication module, the control device with a processor, so as to form a data communication channel for transmitting the wireless signal;
   obtaining, by the processor and via the data communication channel, the wireless signal containing the vibration characteristic data sent by the control device;
   parsing, by the processor, the wireless signal to obtain a drive signal; and
   receiving, by a vibrator detachably fixed to an external device, the drive signal sent by the processor and generating vibration according to the drive signal;
   wherein the vibrator is fixed to the external device by an adhesive layer; or
   the vibrator is detachably fixed to the external device via a body; and the body includes a body portion attached to a rear cover of the external device and a catch portion extending from the body portion to catch the external device.

6. The method of adding the tactile impression as described in claim 5, further comprising:
   after the step of connecting, by the bluetooth module or the near field wireless communication module, the control device with the processor, so as to form the data communication channel for transmitting the wireless signal:
   generating means and a protocol for parsing data;
   wherein the step of parsing, by the processor, the wireless signal to obtain the drive signal comprises:
   parsing, by the processor and according to the means and the protocol for parsing the data, the wireless signal to obtain the drive signal.

\* \* \* \* \*